Jan. 21, 1930.                 B. R. BENJAMIN                 1,744,436
                             FRONT TRUCK FOR TRACTORS
                                Filed Nov. 15, 1923
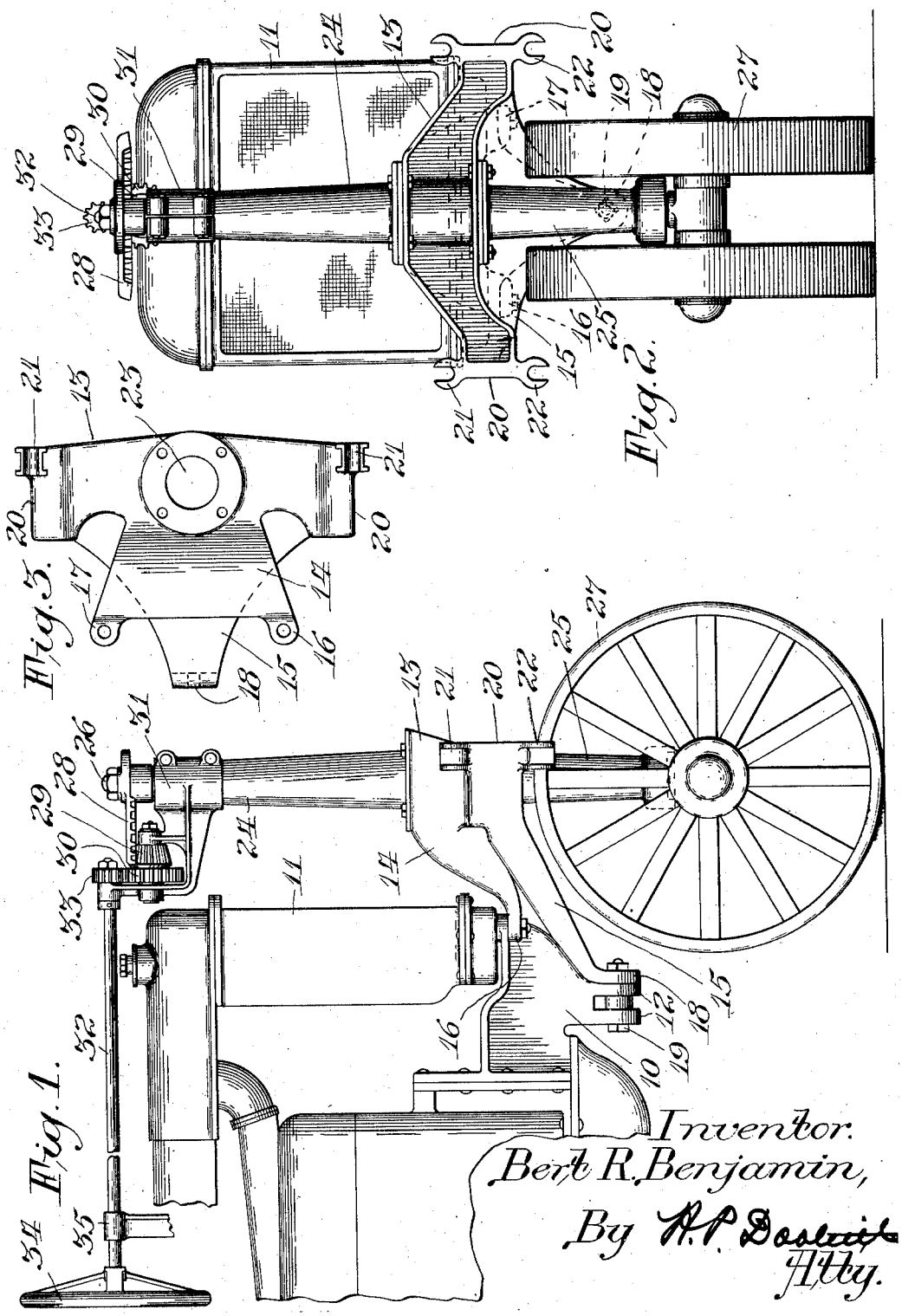
Inventor:
Bert R. Benjamin,
By H. P. Doolittle
Atty.

Patented Jan. 21, 1930

1,744,436

UNITED STATES PATENT OFFICE

BERT R. BENJAMIN, OF OAK PARK, ILLINOIS, ASSIGNOR TO INTERNATIONAL HARVESTER COMPANY, OF CHICAGO, ILLINOIS, A CORPORATION OF NEW JERSEY

FRONT TRUCK FOR TRACTORS

Application filed November 15, 1923. Serial No. 674,824.

This invention relates to tractors and is directed to a front truck structure intended for use on tractors of well-known type as a substitute for the front axle and steering wheels of the usual or standard kind.

In the development of power farming, it has been found that certain cultivating and other implements are much more readily handled and controlled by the driver of a tractor if the implement is carried ahead of or at one side of the tractor and, therefore, in view during operation, and, as the ordinary farm tractor is not adapted to this practice, it is the main object of the present invention to provide a front truck designed for use as a substitute for the ordinary front axle and steering gear and adapted to have certain tillage or other implements connected to it.

With that in view, the invention has been embodied in a special front truck structure having means adapting it for attachment to certain parts beneath the forward end of a tractor frame and equipped with steering means adapted to be controlled from the rear end of a tractor and with bracket portions intended for connection to farming and earth working implements of various types, as hereinafter more definitely described and claimed.

Referring to the accompanying drawings, Fig. 1 is a side view of the front end of a tractor with the substitute truck in position thereon;

Fig. 2 is a similar front view; and

Fig. 3 is a detail plan view of the main body or cross-head of the substitute truck.

In the present instance, the truck embodying the invention is illustrated in connection with a well-known type of small tractor, the front end of which is shown in Fig. 1 as comprising a forwardly extending shelf or radiator support 10, which is riveted to and forms part of the frame or chassis and to which is secured the radiator 11. The radiator support 10 is formed with a pair of parallel downwardly extending lugs 12, provided with openings to receive the pivot pin which carries the front axle ordinarily employed with a tractor of the type stated. In the practice of my invention this usual front axle and steering gear is removed and there is substituted therefor a front support comprising a body or cross-head 13, which may be a single casting formed with a transversely arched forward portion, as seen in Fig. 2, and with upper and lower rearwardly and downwardly extending carrying members or branches 14 and 15.

The upper carrying member 14 comprises laterally spaced arms 16 and 17 adapted to engage beneath the radiator of the tractor and to be secured there by bolts, which may be those serving also to secure the radiator to the radiator support 10. The lower supporting member 15 consists of a single central arm having a vertical lug 18 at its end provided with an opening which is adapted to register with the openings in the lugs 12 and to be secured thereto by suitable means, such as the bolt 19 shown in Fig. 1. This manner of attaching the truck to the tractor affords three approximately equally spaced, angularly related, points of support, the lower one of which is central and back of the others, thus effectively bracing the truck against all strains. The cross-head 13 has also formed thereon or secured thereto at each end implement securing bracket members 20, comprising opposite socket heads 21 and 22, which are adapted to receive the fastening elements of a series of specially designed interchangeable implements, not shown, adapted to be positioned either ahead or at the side of the truck.

The cross-head 13 is provided with a central vertical opening at 23, and upper and lower tubular members 24 and 25 are secured to the cross-head in alignment with said opening and constitute a steering post in which is journalled the vertical standard 26 of a narrow tread steering truck 27. The upper end of the steering standard 26 projects above the tubular member 24 and has secured to it an arcuate rack 28, which is in mesh with a pinion 29 that is secured to or formed integrally with a second pinion 30, both of which are journalled on a shaft carried on a rearwardly extending bracket member 31 secured on the upper end of tubular member 24. The bracket 31 also serves to carry the forward end of a steering shaft 32, which has a spur pinion 33 on its forward end in mesh with the pinion 30 and extends horizontally rearwardly over the radiator and fuel tank of the tractor to a convenient point in the rear of the tractor where it is provided with a steering wheel 34. A second support or bearing for the rear end of shaft 32 is provided as shown at 35, and this may be fastened at any suitable point on the tractor.

With a structure of the above description it is evident that the ordinary front axle and steering gear can be removed and the substitute support fastened beneath the front of the tractor as described, thereby converting the tractor from one having widely spaced front wheels to one having a narrow tread truck located in advance of the radiator and midway between the rear traction wheels. This provides for making short turns and permits employment of various implements, such for instance as a pair of cultivator gangs, at each side of the truck, where they are in full view of the driver on the rear of the tractor, the narrow tread of the truck permitting it to travel between adjacent rows of plants, such as corn, while the rear wheels may be spaced so as to travel between the next adjacent rows, thereby permitting cultivation of two rows at once. Other uses and advantages of the invention will be evident to those familiar with the art.

It will be seen from the above description that the invention greatly extends the usefulness of the ordinary type of farm tractor and it is evident that certain modifications of the specific structure described may be made without departure from the invention as defined in the following claim.

What is claimed as new is:

A substitute front support for tractors comprising a cross-head provided with implement securing sockets at its ends and having a central vertical steering post, a narrow tread steering truck having a standard journalled in the cross-head and post, steering means secured to the standard above the post, and carrying members comprising upper laterally spaced arms adapted to be fastened beneath the radiator shelf of a tractor, and a lower central arm adapted for attachment to the pivot lugs for the front axle thereof.

In testimony whereof I affix my signature.

BERT R. BENJAMIN.